3,110,650
SYNERGISTIC ANALGESIC COMPOSITIONS
Edmundo Fischer, Jorge L. Szabo, and Peter P. Stark, Buenos Aires, Argentina, assignors to Szabo Hnos Kessler & Cia. S.R.L., Buenos Aires, Argentina, a company of Argentina
No Drawing. Filed Sept. 14, 1961, Ser. No. 137,959
8 Claims. (Cl. 167—65)

The present invention relates to compositions the essential active ingredients of which are an analgesic in admixture with an oxazoline such as an oxazolidinone or oxazolidinimine and in which the oxazoline acts to synergize the action of the analgesic.

It has been discovered in accordance with this invention that analgesics such as morphine, morphine-type, aminopyrine, dihydrocodeine and other known analgesics can be synergized through the combination therewith of 5-chloromethyl-2-oxazolidinone or 5-chloro-methyl-2-oxazolinimine. Tests were carried out in accordance with the method of Eddy and Leimbach (J. Pharmacol. Exptl. Therap. 107, 285 (1953). According to this method, white mice are dropped on to a metal plate maintained at a constant temperature of 59° C. and their reaction time to the heating stimulus as received through the hind feet is measured (Burger: Medicinal Chemistry, second edition, Interscience Publishers, Inc., New York, 1960). The present compositions were tested in the same manner and gave the results set forth below.

The invention is illustrated by the following non-limitative examples:

EXAMPLE I 5 mgs. of 5-chloromethyl-2-oxazolidinone and 12.5 mgs. of dihydrocodeine gave a greater effect than the same dose of dihydrocodeine alone. Mice treated with dihydrocodeine remained on the hot plate 2.6 seconds longer than untreated animals and the animals treated with the mixture remained on the hot plate 3.5 seconds longer on the average.

The same amount of dihydrocodeine combined with 12.5 mgs. per kilogram of 5-chloromethyl-2-oxazolidinone enabled the mice to remain on the hot plate 4.6 seconds longer whereas with 25 mgs. of 5-chloromethyl-2-oxazolidinone and 12.5 mgs. of dihydrocodeine they remained on the hot plate 5.2 seconds longer than the untreated animals.

The specified quantities of 5-chloromethyl-2-oxazolidinone alone were without effect.

EXAMPLE II

Mice treated with 1.25 mgs. per kilogram of morphine and 5 mgs. of 5-chloromethyl-2-oxazolidinone were able to remain on the hot plate four seconds longer than untreated animals and mice treated with the same amount of morphine alone remained only 1.4 seconds longer.

Another group of mice treated with the same amount of morphine combined with 10 mgs. per kilogram of 5-chloromethyl-2-oxazolidinone remained on the hot plate 5.4 seconds longer than untreated animals.

A third group treated with the same amount of morphine and 20 mgs. per kilogram of 5-chloromethyl-2-oxazolidinone remained on the hot plate an average of 6.8 seconds longer.

EXAMPLE III

While 50 mgs. per kilogram of aminopyrine had no effect on the time the mice remained on the hot plate, when combined with 10 mgs. per kilograms of 5-chloromethyl-2-oxazolidinone, the mice remained on the hot plate 3.5 seconds longer than untreated animals.

EXAMPLE IV

Similar results were obtained using phenazocine as the analgesis agent. In a dose of 0.5 mg. per kilogram the drug caused the mice to remain on the hot plate 4.4 seconds longer than untreated animals but when combined with 20 mgs. per kilogram of 5-chloromethyl-2-oxazolidinone, a much greater effect was observed in that the animals remained on the hot plate 6.1 seconds longer than untreated animals.

When the same amount of phenazocine was combined with 10 mgs. per kilogram of 5-chloromethyl-2-oxazolidinone, the animals remained on the hot plate 5 seconds longer than untreated animals.

Using 0.25 mg. per kilogram of phenazocine alone, the mice remained on the hot plate 2.8 seconds longer than untreated animals but when this analgesic was combined with 20 mgs. of 5-chloromethyl-2-oxazolidinone the mice remained on the hot plate 4.7 seconds longer.

Similar results were obtained with other synergists such as chloropromazine and 5-(o-methoxyphenoxymethyl)-2-oxazolidinone. It is important to note that 5-chloromethyl-2-oxazolidinone has no tranquilizing or central nervous system depressant action and that no changes were observed in the activity of mice treated with the indicated doses of 5-chloromethyl-2-oxazolidinone by itself as measured in an actophotometer.

The mice used weighed 20 to 25 grams and it was found that when they were treated with a mixture of any central acting analgesic such as morphine and its derivatives or aminopyrine compounds or synthetic products having morphine-like properties, an unexpectedly stronger analgesic effect was obtained through the use of the mixture than in the case of the analgesic drugs when used alone. The tests thus clearly show that the analgesic action is synergized or potentiated by means of the compositions of the present invention. This has the important advantage that for a given analgesic action a lesser amount of the analgesic can be used with consequent reductions in side reactions or secondary effects. It is well known that commonly used analgesics do have such adverse side reactions and secondary effects and hence it is highly desirable to be able to reduce the amount of analgesic administered.

5-chloromethyl-2-oxazolidinone may be represented as follows:

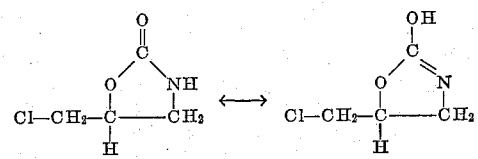

5-chloromethyl-2-oxazolidinimine may be represented as follows:

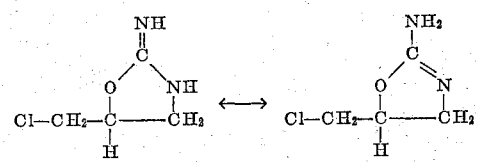

*Toxicity of 5-Chloromethyl-2-Oxazolidone*

Mice of a weight between 20 and 25 grams could be treated by injection of 1 gram/kg. of 5-chloromethyl-2-oxazolidinone without lethal effects. If it is taken into consideration that the minimal efficacious dose corresponds to 5 mg./kg., it can be stated that not even a 200-fold dose can be considered as lethal.

*List of Some Central Analgesic Substances of the Morphine Type*

Pethidine
Dextromoramide (Palfium)
Dihydrocodeinone
Dihydrohyxycodeinone
Dihydroisocodeine
Dihydromorphine
Ketobemidone
Methadone
Normethadone
1-3-hydroxy-N-methylmorphine
Meperidine
Demerol The clinical effects in patients with neoplasm, burnings or traumatic lesions confirmed the experimental results by a synergistic combination of analgesic drugs with 5-chloromethyl-2-oxazolidinone. Such a combination permitted a reduction in the dose of the analgesic substance by 30–50% or use the full dose with a greater or enhanced analgesic effect.

The following examples or clinical formulas are illustrative but not limitative, the usual clinical dose of 5-chloromethyl-2-oxazolidinone being 100–150 mgs. but not restricted thereto:

(1)

| | Mg. |
|---|---|
| 5-chloromethyl-2-oxazolidinone | 100 |
| Aminopyrine | 200 |

(2)

| | |
|---|---|
| Dihydrococodeine bitartrate | 15 |
| 5-chloromethyl-2-oxazolidinone | 150 |

(3)

| | |
|---|---|
| 5-chloromethyl-2-oxazolidinone | 100 |
| Dihydrocodeine bitartrate | 15 |
| Aminopyrine | 150 |

(4)

| | |
|---|---|
| 5-chloromethyl-2-oxazolidinone | 150 |
| Morphine hydrochloride | 3 |

(5)

| | |
|---|---|
| 5-chloromethyl-2-oxazolidinone | 150 |
| Phenazocine | 0.3 |

Such formulas can be dispensed in the form of capsules, tablets, coated tablets, pills, suppositories or injectables, etc. The duration of the effect is 2–5 hours, the frequency of the administration being varied as required. Side effects have not been observed.

Similar synergistic effects have been observed combining central analgesic drugs with the oxazoline 5-chloromethyl-2-oxazolidinimine (melting point 142° C.). For example: 12.5 mg. of dihydrocodeine combined with 5 mg. of 5-chloromethyl-2-oxazolidinimine allows the remanence of the animals for 4.2 seconds longer than without a treatment. Animals treated with dihydrocodeine alone stay for 2.2 seconds. In another experiment, the dose of 5-chloromethyl-2-oxazolidinimine was raised to 12.5 mg./kg. giving a longer remanence (4.7 sec.). The dose of 25 mg. of this substance, always combined with 12.5 mg. of dihydrocodeine, raised the remanence time to 5.7 seconds.

Notwithstanding, the 5-chloromethyl-2-oxazolidinimine is a somewhat more toxic substance than the former having an $LD_{50}$ in mice at 400 mg./kg. dosage.

While the invention has been particularly described with respect to results of tests on mice by the Eddy and Leimbach technique, it is to be understood that the compositions may equally well be administered to humans with comparable or proportionate results. From the foregoing examples, it will be further noted that in the mixture of analgesic and 5-chloromethyl-2-oxazolidinone or 5-chloromethyl-2-oxazolidinimine, the relative proportions range from about 5:1 to 1:80 parts by weight. In the case of dihydrocodeine and 5-chloromethyl-2-oxazolidinone, the relative proportions range from about 2.5:1 to 1:2. In the case of dihydrocodeine and 5-chloromethyl-2-oxazolidinimine, the relative proportions are about 1:1. The proportions in the other compositions will be apparent from the examples.

What is claimed is:

1. A composition the essential active ingredients of which are an analgesic selected from the group consisting of dihydrocodeine, morphine and aminopyrine in admixture with an oxazoline selected from the group consisting of 5-chloromethyl-2-oxazolidinone, 5-chloromethyl-2-oxazolidinimine, and 5 - (o - methoxyphenoxymethyl) - 2-oxazolidinone in the relative proportions ranging from about 5:1 to 1:80 parts by weight, the oxazoline acting to synergize the action of the analgesic.

2. A composition the essential active ingredients of which are dihydrocodeine and 5-chloromethyl-2-oxazolidinone in the relative proportions ranging from about 2.5:1 to 1:2 parts by weight, the oxazolidone acting to synergize the analgesic action of the dihydrocodeine.

3. A composition the essential active ingredients of which are dihydrocodeine and 5-chloromethyl-2-oxazolidinimine in the relative proportions of about 1:1 parts by weight, the oxazoline acting to synergize the analgesic action of the dihydrocodeine.

4. A composition the essential active ingredients of which are dihydrocodeine and 5-chloromethyl-2-oxazolidinone in the relative proportions of about 1:2 parts by weight, the oxazoline acting to synergize the analgesic action of the dihydrocodeine.

5. A composition the essential active ingredients of which are morphine and 5-chloromethyl-2-oxozolidinone in the relative proportions of about 1:4 parts by weight, the oxazoline acting to synergize the analgesic action of the morphine.

6. A composition the essential active ingredients of which are aminopyrine and 5-chloromethyl-2-oxazolidinone in the relative proportions of 5:1 parts by weight, the oxazoline acting to synergize the analgesic action of the aminopyrine.

7. A composition the essential active ingredients of which are phenazocine and 5-chloromethyl-2-oxazolidinone in the relative proportions ranging from about 1:40 to 1:80, the oxazoline acting to synergize the analgesic action of the phenazocine.

8. A method of synergizing the analgesic action of an analgesic selected from the group consisting of dihydrocodeine, morphine and aminopyrine which comprises combining therewith an oxazoline selected from the group consisting of 5-chloromethyl-2-oxazolidinone, 5-chloromethyl-2-oxazolidinimine, and 5-(o-methoxyphenoxymethyl)-2-oxazolidinone in the relative proportions ranging from about 5:1 to 1:80 parts by weight.

References Cited in the file of this patent

UNITED STATES PATENTS 2,895,960    Lunsford _____ July 21, 1959

OTHER REFERENCES

Beasley: J. of Pharm. and Pharmacol., vol. 9, January–June 1957, pages 10–19.
Wilson: The American Drug Index, 1958, page 36.
Merck: The Merck Index, 1960, page 60.
Burger: Medicinal Chemistry, 1960, pages 312–319.